United States Patent
Chien

(10) Patent No.: US 6,270,229 B1
(45) Date of Patent: *Aug. 7, 2001

(54) AUDIO DEVICE INCLUDING AN ILLUMINATION ARRANGEMENT

(76) Inventor: Tseng-Lu Chien, 8F, No. 29, Alley T3, Lin-Shen Street, Shi-Chi Town, Taipei, Haong (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/773,092

(22) Filed: Dec. 24, 1996

(51) Int. Cl.$^7$ ..................................................... F21V 33/00
(52) U.S. Cl. .................... 362/84; 362/86; 362/88
(58) Field of Search ............................... 362/84, 86, 811, 362/87, 88; 40/544, 457; 84/464, 464 R; 340/815.46; 379/52

(56) References Cited

U.S. PATENT DOCUMENTS

| | | | |
|---|---|---|---|
| 1,174,377 | * | 3/1916 | Appleton ............................. 362/255 |
| 1,690,279 | * | 11/1928 | Craft ................................... 84/464 R |
| 4,216,464 | | 8/1980 | Terry ..................................... 340/321 |
| 4,256,009 | * | 3/1981 | Verduin et al. ....................... 362/811 |
| 4,668,895 | * | 5/1987 | Schneiter ............................. 362/811 |
| 4,768,086 | * | 8/1988 | Paist ..................................... 362/811 |
| 4,953,205 | * | 8/1990 | Yang ...................................... 379/52 |
| 4,999,936 | * | 3/1991 | Calamia et al. ....................... 40/544 |
| 5,365,149 | * | 11/1994 | Blakeslee et al. ............. 340/815.46 |
| 5,451,842 | | 9/1995 | Chien .................................... 315/185 |
| 5,469,342 | * | 11/1995 | Chien ...................................... 362/84 |
| 5,475,574 | * | 12/1995 | Chien .................................... 362/108 |
| 5,479,325 | * | 12/1995 | Chien ...................................... 362/84 |
| 5,485,355 | * | 1/1996 | Voskoboinik et al. ................ 362/84 |
| 5,845,987 | * | 12/1998 | Painter .................................. 362/84 |
| 5,917,288 | * | 6/1999 | Feldman et al. ............. 340/815.46 |
| 6,082,867 | * | 7/2000 | Chien ...................................... 362/84 |
| 6,085,698 | * | 7/2000 | Klein ...................................... 362/84 |

FOREIGN PATENT DOCUMENTS

2155797 * 10/1985 (GB) ................... 84/464 R

* cited by examiner

Primary Examiner—Sara Clarke
(74) Attorney, Agent, or Firm—Howard C. Miskiv; Gloria Tsui-Yip

(57) ABSTRACT

An audio device or sound pick-up device includes a three-dimensional electro-luminescent lighting element triggered by an audio or sound signal generated or processed by the device.

28 Claims, 16 Drawing Sheets

AUDIO DEVICE INCLUDING AN ILLUMINATION ARRANGEMENT

BACKGROUND OF THE INVENTION

1. Field of the Invention

This invention relates to an audio device that includes an illumination arrangement, and in particular to an audio device that includes at least one three-dimensional electro-luminescent lighting element.

2. Discussion of Related Art

It is known to decorate audio equipment with three-dimensional lighting elements such as neon tubes or fiber optics, but the disadvantages of such arrangements, including fragility, high cost, high power consumption, and difficulties in assembly, have to date limited their applicability.

One way to overcome the disadvantage of fragility, high cost, and high power consumption is to use electro-luminescent lighting elements, such as the ones described in copending U.S. patent application Ser. Nos., 08/305,294 now U.S. Pat. Nos. 5,572,817; 08/343,404; 08/343,915; 08/383,404 now U.S. Pat. No. 5,667,394; 08/383,405; 08/409,925 now U.S. Pat. No. 5,611,621; 08/421,647 now U.S. Pat. No. 5,688,038; 08/432,707; 08/438,373 now U.S. Pat. No. 5,570,946; 08/444,064 now U.S. Pat. No. 5,720,651; 08/436,007 now U.S. Pat. No. 5,479,325; 08/444,064; 08/489,160; 08/498,258; 08/510,701 now U.S. Pat. No. 5,876,108; 08/552,940; 08/561,973 now U.S. Pat. No. 5,683,154; 08/611,049 now U.S. Pat. No. 5,879,069; 08/614,001 now U.S. Pat. No. 5,722,754; 08/712,484; 08/734,872, and issued U.S. Pat. Nos. 5,451,842; 5,469,342; 5,475,574; 5,479,325; 5,566,384, and 5,570,946. These lighting arrangements, which in general are in the form of panels or strips, offer flexibility, durability, and relatively low cost and power consumption with a relatively wide choice of colors and high visibility in comparison with most alternative lighting arrangements.

One commercially available electro-luminescent panel arrangement is manufactured by Durel Company USA, whose electro-luminescent panels are used in the Timex Indigloo wristwatch, and may also be used, for example, as backlighting for the scales on tuner displays in compact disc and laser disc players, amplifiers and receivers, synthesizers and keyboards, and other conventional audio equipment. The Durel Company electro-luminescent panel is a multi-layer panel made up of a conductive layer, a dielectric layer, a phosphor layer, and filter layers with micro-encapsulated particles to obtain a thickness of between 0.2 mm and 0.4 mm which offers large area illumination and low power consumption.

Despite the advantages of flat panel arrangements, however, they cannot completely replace neon lights or fiber optics since they can only emit light in limited directions. In addition, the conventional flat panel arrangements permit only a single color per phosphor coating, and require termination at predetermined points at the edge of the panels, severely restricting choice of panel placement application which can accommodate the necessary wiring. This is particularly inconvenient for custom designs or do-it-yourself applications, in which it would be advantageous for the consumer to make the terminals rather than having to work around fixed terminals.

Although flat panel arrangements can be bent into cylinders, the minimum bending radius for a typical flat panel having a thickness of 0.28 mm is approximately 8.0 mm, and thus to form a cylinder having a length of ymm and a diameter of 16 mm would require a panel of $(16\pi \times y)\text{mm}^2$. Such a cylinder would be both too large for use on most audio devices where miniaturization is a desirable quality, and yet would require an excessive size of flat panel for the coverage provided by the three-dimensional illumination. As a result, three-dimensional electro-luminescent arrangements made by simply bending a flat electro-luminescent panel are impractical.

To overcome the inherent limitations of conventional flat panel arrangements, a new electro-luminescent lighting technology has been proposed which offers the advantages of flat-panel arrangements without the disadvantages by utilizing a coaxial construction made up of a center conductor, surrounding dielectric and phosphor layers, and a coaxial outer conductor to obtain an electro-luminescent lighting element capable of emitting light over an angle of 10° 360°, and yet which has a diameter equal to the diameter of the center conductor and twice the thickness of the surrounding layers, thus providing a three-dimensional electro-luminescent lighting element which is significantly thinner and uses less materials than could be obtained by simply bending a flat panel into a cylinder. This type of lighting element can provide a full neon light spectrum, and unlike other three-dimensional lighting systems such as incandescent lights, light emitting diodes, fluorescent tubes, and cold cathode tubes in combination with fiber optics or high light transmission devices, can provide uniform brightness over an extended length of up to 3000 meters, with multiple colors including red, orange, yellow, green, blue, pink, and white, and so forth.

One problem with the proposed three-dimensional electro-luminescent lighting arrangement has been the difficulty in terminating the lighting elements. This problem was addressed by the Inventor in copending application 08/758,393, filed Nov. 29, 1996 now U.S. Pat. No. 6,082,867, by extending the center and outer conductors to provide terminals in the form of insulated wires which could be stripped to provide the necessary terminations, permitting utilization of the elements in a variety of new applications, including as decorative piping for footwear and other wearing apparel, in shoelaces, and in watches or clocks.

The present application describes various additional implementations made practical by the novel termination arrangement and method described in the copending application, extending the use of three-dimensional electro-luminescent lighting elements into the field of audio devices or equipment. The audio devices to which the present invention may be applied include compact disc players, laser disc or DSS players, amplifiers, headphones, alarms, conventional and portable stereo systems, synthesizers, keyboards, and so forth, thereby providing illuminated audio devices which are safer, lower in cost and power consumption, and more versatile than those employing neon or fiber optic lighting arrangements, while nevertheless exhibiting the brightness and attractive colors provided by neon or fiber optic arrangements. In addition, the present invention makes use of the additional advantages of three-dimensional lighting arrangements described in the copending application, including the ability to control colors more precisely, and to change colors and/or light intensity by changing the trigger frequencies and/or voltages of an element so as to provide dynamic changes in color and intensity responsive to sounds being generated or processed by the audio device for a unique light performance.

SUMMARY OF THE INVENTION

It is accordingly an objective the invention to provide audio devices or equipment with an improved three-dimensional lighting arrangement that offers the attractiveness of neon lighting arrangements at a lower cost and lower power consumption, and which is less fragile and easier to assemble.

It is a further objective of the invention to provide audio devices having the above advantages, including three-dimensional electro-luminescent lighting elements that are responsive to sounds output by the audio equipment to provide an attractive light show.

It is a still further objective of the invention to provide audio devices including lighting arrangements having the above advantages and which are capable of changing colors and/or light intensities in response to sound signals.

It is yet another objective of the invention to provide a lighting arrangement for audio equipment having the above advantages and which can be adapted to use an existing audio transformer within the device.

Finally, it is an objective of the invention to provide a lighting arrangement for audio equipment which provides three-dimensional lighting whose intensity and colors are responsive to audio signals, and which is capable of providing uniform three-dimensional illumination over a continuous extended length having a diameter of from 0.5 mm to 8 mm and over an angle of from 10° to 360°., is non-breakable, relatively low in cost, power consumption (8 ma, 3 v, per 10 cm), and heat output compared with neon systems offering comparable brightness (up to 100 candle power) and colors, is easily terminated by the consumer and in which defective terminals can easily be corrected during production by simply stripping an additional length of wire, and which resists damage from over-bending, twisting, heat, water and humidity, temperature extremes, pressure, breakage, ultraviolet light, and other environmental hazards.

These objectives are achieved, in accordance with the broadest principles of the invention, by adapting for use in a variety of audio devices and or equipment an electro-luminescent element of the type which employs a coaxial construction made up of a center conductor, surrounding dielectric and phosphor layers, a coaxial outer conductor, and terminals in the form of wires extending from the inner and outer conductors to obtain an improved three-dimensional electro-luminescent lighting element which provides better lighting effects than flat panel arrangements and yet which is significantly easier to install or assemble to the audio equipment, and which permits the arrangement to exhibit such novel effects as flashing while changing colors as different phosphor coatings of the element are triggered or the input current frequency or other parameters are varied.

The three-dimensional electro-luminescent lighting element used in the preferred embodiments of the invention can easily be attached to a variety of audio equipment, including speaker covers or housings, headset housings, and so forth, and can easily be placed inside the PVC tubing of a telephone coil, or a transparent housing of a telephone, telephone handset, speaker, or headphone, computer speaker, televisions, portable compact disc or tape player or radio, synthesizer or keyboard, and so forth, while utilizing the power source of the electrical device rather than an additional power source.

In additional to sound sensing functions that made the illumination arrangement responsive to music, the illumination arrangements of the preferred embodiments of the invention can be voice driven, or light sensitive. In the case of activation by sound, the activation can be based on the frequency or volume of the sound, or both, to provide both color and intensity changes.

The three-dimensional lighting elements of the preferred embodiment can be assembled to the disclosed audio devices by a variety of methods, include placement in a transparent tube or within a holder, groove, or the like on the main object which constitutes the audio device. Additional attachment means may include hook and loop fasteners such as Velcro™, or conventional attachments means suitable for stringing or hanging decorative piping including three-dimensional lighting elements.

Termination of the elements is accomplished, as indicated above, by simply stripping the wire terminals of the elements using ordinary stripping devices, and by using ordinary wire connectors such as wire nuts, soldering, or the like to enable the consumer to easily add the elements to audio equipment.

Because the three-dimensional electro-luminescent lighting element utilized in the various preferred embodiments of the invention includes a wire as the center conductor, rather than a thin plating on a backsheet of the type used in conventional electro-luminescent elements, the element can carry much higher voltages, enabling more precise color selection, including purely white light if desired. In the case of an electro-luminescent lighting element which emits white light, the element can conveniently be placed inside a larger tube which provides a color filtering effect, and which can also include masking, stencils, and so forth to provide further decorative effects.

In addition, as described in the copending application, the inner phosphor layer of the three-dimensional electro-luminescent lighting element used in the preferred embodiments of the invention can easily be arranged in any desired manner to obtain multiple colors at different points along the length of the element, or multiple lit and non-lit areas, with simple wire connections for each separate phosphor area conveniently being placed in a wire harness or hidden under a surface of the main object to which the three-dimensional electro-luminescent lighting element is attached, and dynamic variation of the colors emitted by the preferred three-dimensional electro-luminescent lighting element can be achieved by using a variable frequency output circuit such as the output of an audio device pre-amplifier or power amplifier to change the color performance of the electro-luminescent lighting elements.

The trigger circuit connected to the pre-amplifier or power amplifier circuit can be incorporated with at least one sensor to trigger the circuit, and be used to control single or multiple tubes by connecting the variable frequency circuit to the output of a radio, computer, car, boat, or home stereo speaker system so that the colors change in response to music. Because of the sensitivity of the colors to frequency, a very colorful light show can easily be obtained using this arrangement.

DETAILED DESCRIPTION OF THE PREFERRED EMBODIMENTS

Figure 1A:
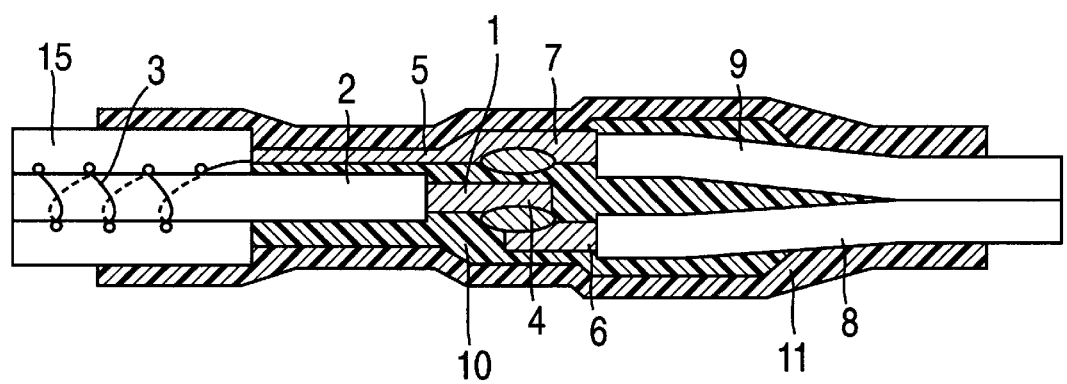
FIG. 1A is a partially cross-sectional view of a three-dimensional electro-luminescent lighting element connected according to the principles of a preferred embodiment of the invention.
Figure 1B:
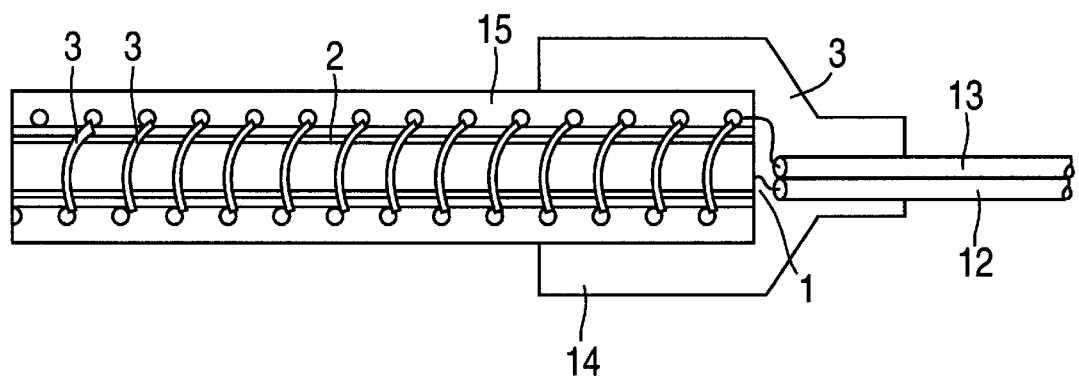
FIG. 1B is a partially cross-sectional view also illustrating an electro-luminescent lighting element constructed and connected according to the principles of a preferred embodiment of the invention.

Each of the embodiments of the invention preferably makes use of a three-dimensional electro-luminescent lighting element of the type illustrated in FIGS. 1A and 1B. This three-dimensional lighting element includes a center conductor 1 surrounded by at least one set of electro-luminescent layers 2, which in turn is surrounded by an outer conductor 3, the inner and outer conductors being extended to form wire terminals according to the principles described in the copending application Ser. No. 08/758,393, filed Nov. 29, 1996 now U.S. Pat. No. 6,082,867.

In each of the illustrated variations of the preferred three-dimensional electro-luminescent lighting element, the center conductor 1 in the form of a metal wire or tube-shaped conductor having a diameter sufficient to carry a desired voltage and current, and may be directly coated with the phosphor layer 2, or with a dielectric layer (not shown) on which a phosphor is coated, or with multiple dielectric and/or phosphor layers using any of a variety of known layering techniques, including the techniques described, for example, in copending application Ser. No. 08/746,706, filed Nov. 15, 1996, and entitled "Multiple Segment Electro-Luminescent Lighting Arrangement." The phosphor material may either extend along the entire length of the center conductor, or along portions of the center conductor, and may consist of a single type of phosphor particle or multiple types of particles, or combinations of single and multiple particle coatings.

Surrounding the phosphor/dielectric layers 2 is the outer conductor 3, which may also be in the form of a coating or, as illustrated, a helically wound wire or coil which extends from the end of the electro-luminescent lighting element and which, along with the center conductor, or a wire attached thereto, forms the terminals for the electro-luminescent lighting element.

In the arrangement illustrated in FIG. 1A, the center conductor 1 and outer conductor 2 are soldered at ends 4 and 5 to the conductors 6 and 7 of insulated lead wires 8 and 9, which are encapsulated or otherwise separated from each other by a dielectric 10 and enclosed within a heat shrink tube 11 to form an easily handled and reliable connection, while in the arrangement illustrated in FIG. 1B, the wires of the center conductor 1 and outer conductor 3 are the respective ends of lead wires 12 and 13 which have been stripped of insulation, the point at which the lead wires exit the electro-luminescent lighting element being protected by a sleeve or bushing 14.

It will of course be appreciated that the electrical connections between the center and outer conductors and the respective leads of the element may be effected by any of a variety of methods or means, and that the leads may be attached to the center and outer conductors anywhere along the length of the element, and also at a plurality of locations along the length of the element if individual control of different segments is desired. In all such cases, connection simply involves electrical connection of wires, rather than more sophisticated pre-set terminal attachment methods required in some of the prior flat panel designs, so that new terminals can be created and defective terminals repaired or replaced simply by stripping the wires.

Finally, as shown in both FIGS. 1A and 1B, the three-dimensional electro-luminescent lighting element is surrounded by a protective outer layer 15 made of PVC or a like material. Those skilled in the art will note that, unlike the conventional flat panel, the present invention requires only a single protective layer, thereby saving materials costs and providing improved protection from moisture, overbending, ultra-violet radiation, and other environmental hazards.

Figure 1C:
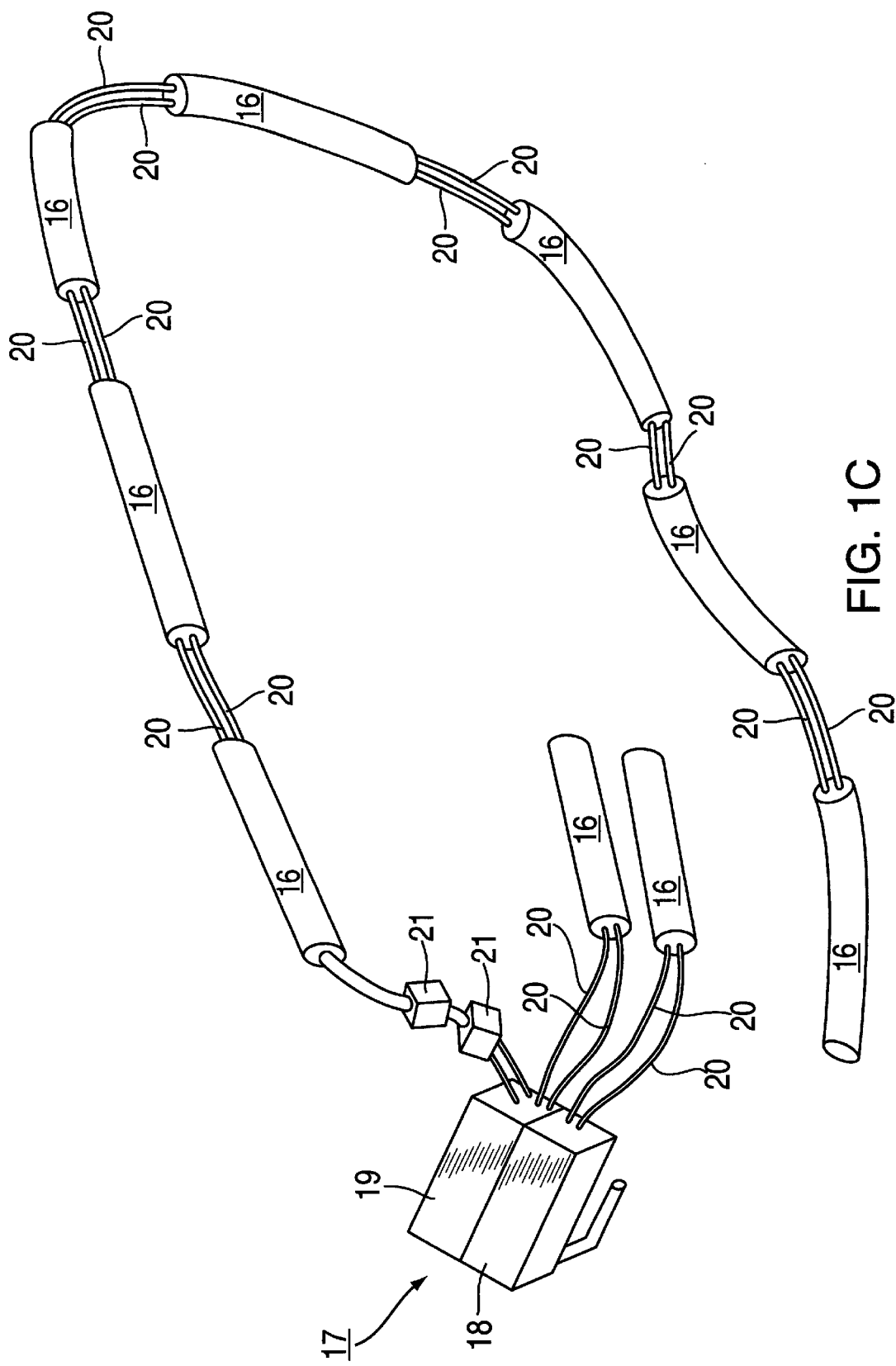
FIG. 1C is a perspective view of a multiple element arrangement of three-dimensional electro-luminescent lighting elements of the type illustrated in FIGS. 1A and 1B, including parallel and series connections.

As illustrated in FIG. 1C, the leads of a plurality of electro-luminescent lighting elements 16 similar to those illustrated in FIGS. 1A and 1B may be connected directly to power pack 17 having compartments for a power supply 18 and control circuit 19, or by inexpensive electric lead wires 20 to other electro-luminescent lighting elements of similar or different colors to form chains or strings of elements, which can be connected in series or in parallel and controlled to provide a variety of different lighting effects, including flashing, steady on, chasing, random, fade in/fade out, color changing, light intensity changing, and partial length lighting effects.

While particular control circuits will be described below, those skilled in the art will appreciate that the control circuit may take a variety of forms, so long as the output of the control circuit has a frequency and voltage sufficient to trigger the electro-luminescent lighting elements by causing a varying electrical field between the center and outer conductors of each element. The power source can either include a DC power source and inverter, or an AC power source, and can be in the form of batteries, a generator, a hook-up to the power grid, or any other convenient source of electrical power.

Finally, as illustrated in FIG. 1C, some of the electro-luminescent lighting elements 16 are conveniently connected to the control circuitry by a quick disconnect electrical connector, although the electro-luminescent lighting elements could of course be wired directly to the control circuit and power supply.

Figure 1D:
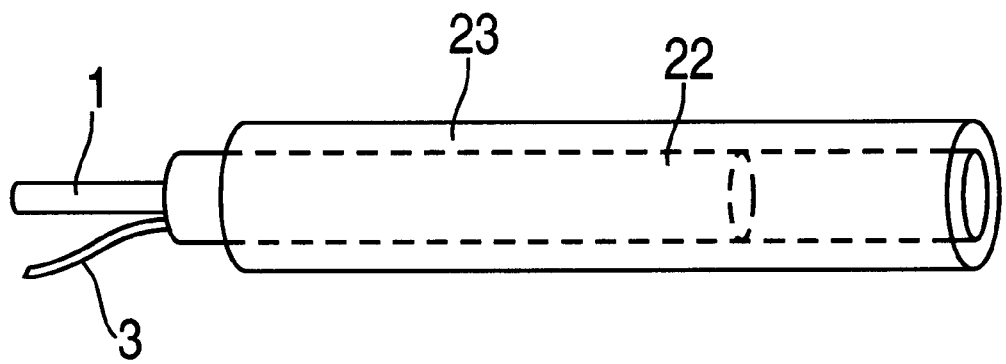
FIG. 1D is a perspective view of a variation of the three-dimensional electro-luminescent lighting element illustrated in FIGS. 1A and 1B, including a colored high transmitivity light tube and a purely white light emitting electro-luminescent tube.

Because the center conductor of the preferred three-dimensional electro-luminescent lighting element does not need to be as thin as the electrode of a flat panel, it is possible to achieve a purely white light electro-luminescent lighting element 22. This offers the possibility of surrounding the elements with masks, filters or colored elements 23 to increase the color choices provided by the elements, as illustrated in FIG. 1D. Normally, different colored electro-luminescent lighting elements require different triggering frequencies, but if the color of the element is determined by a surrounding filter, then a common electrical connection can be used for different colored elements, simplifying the wiring requirements.

Figure 1E:
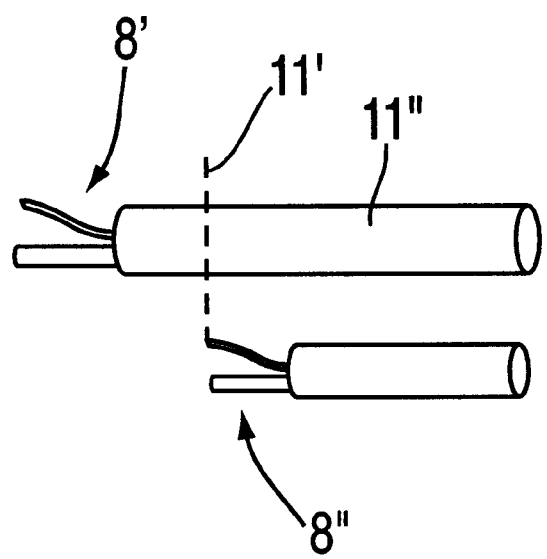
FIG. 1E is a diagram illustrating a method of forming new terminals and repairing defective terminals according to the principles of the invention.

The method of replacing or repairing old terminals is illustrated in FIG. 1E. Essentially, the defective terminal 8' is simply cut-off along a cut line 11' and the outer protective layer or layers 11" surrounding the inner and outer conductors is stripped to thereby form new terminal 8". In contrast, when a fixed terminal of a conventional electro-luminescent element has a manufacturing defect or is broken, repair is generally impractical and the entire element must be discarded.

Figure 1F:
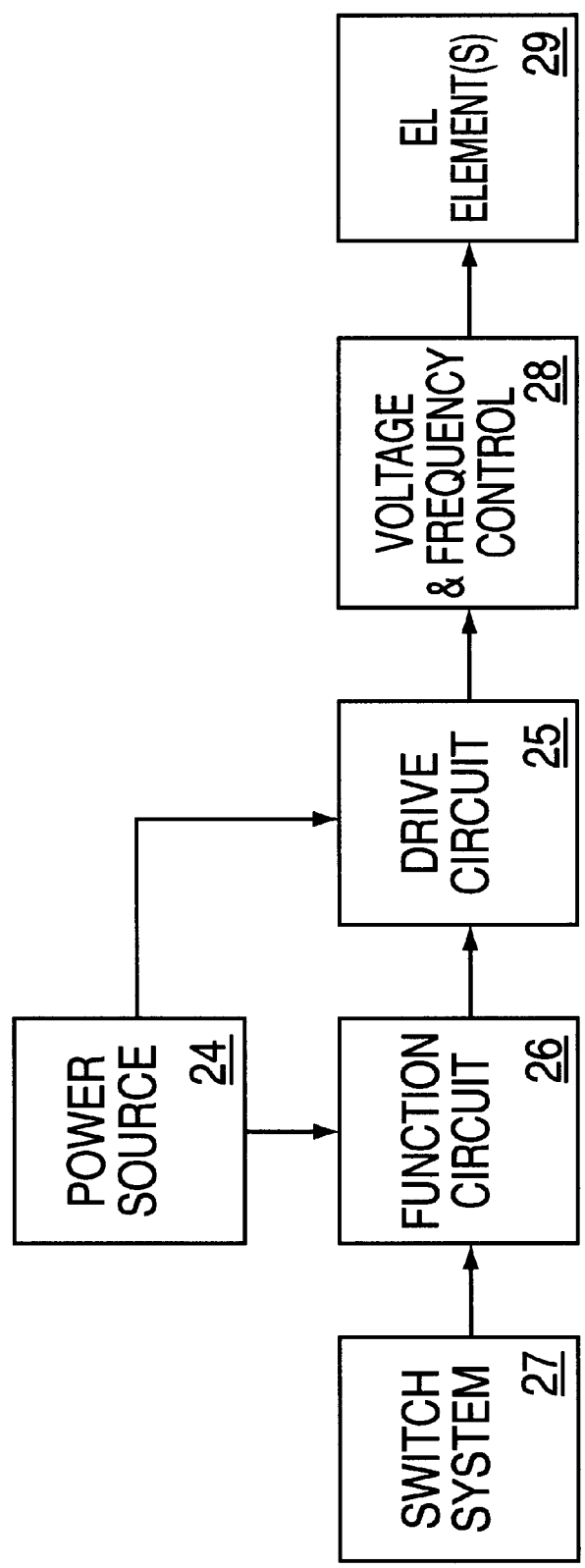
FIG. 1F is a block diagram illustrating a control circuit for the three-dimensional electro-luminescent lighting elements of the preferred embodiments of the invention.

The basic circuitry used to trigger the above-described three-dimensional electro-luminescent lighting element is illustrated in FIG. 1F, and includes some sort of power source 24, whether in the form of one or more rechargeable or non-rechargeable batteries, a generator, capacitors, the public power supply, or the like, and also a drive circuit 25 connected to the power source 24, the drive circuit being in the form of an inverter if the power supply is a DC power supply, a function circuit 26 for turning the electro-luminescent on and off via the drive circuit, and which may be at least partly responsive to a switch system 27, a voltage and frequency control or adjustment circuit 28 for converting the output of the drive circuit into a voltage and frequency capable of causing the electro-luminescent lighting elements 29 to emit photons. Depending on the nature of the audio device in which the lighting arrangement is to be used, either drive circuit 25, function circuit 26, switch system 27, and/or voltage and frequency control or adjustment circuit 28 can be replaced by existing circuitry used to drive the speakers or sound reproduction/generating components of the device.

Figure 1G:
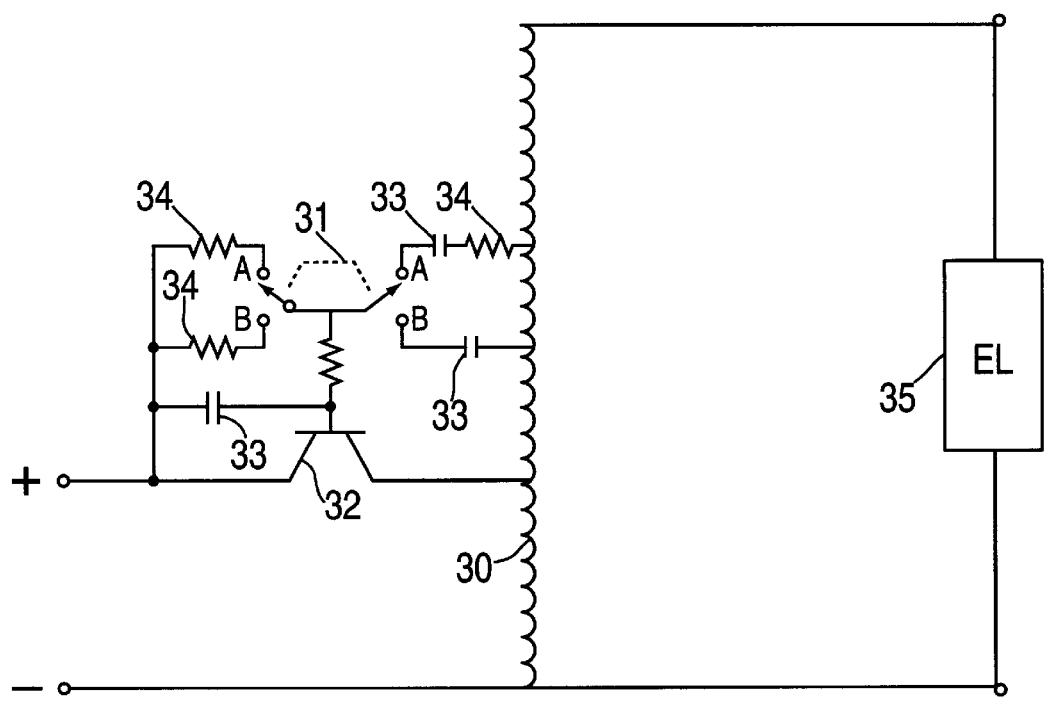
FIG. 1G is a schematic circuit diagram illustrating an example of a basic circuit that could be used in connection with the three-dimensional lighting arrangements of the preferred embodiments of the invention, and which includes a transformer.

One specific example of a suitable basic control circuit is illustrated in FIG. 1G. In this example, the control and power supply circuit includes an inductor/transformer 30, switch 31, transistor 32, three capacitors 33, and three resistors 34, connected to cause the electro-luminescent light 35 to flash or remain steady. The inductor transformer can advantageously be part of the existing audio circuitry, such as the output transformer of a power amplifier.

Figure 1H:
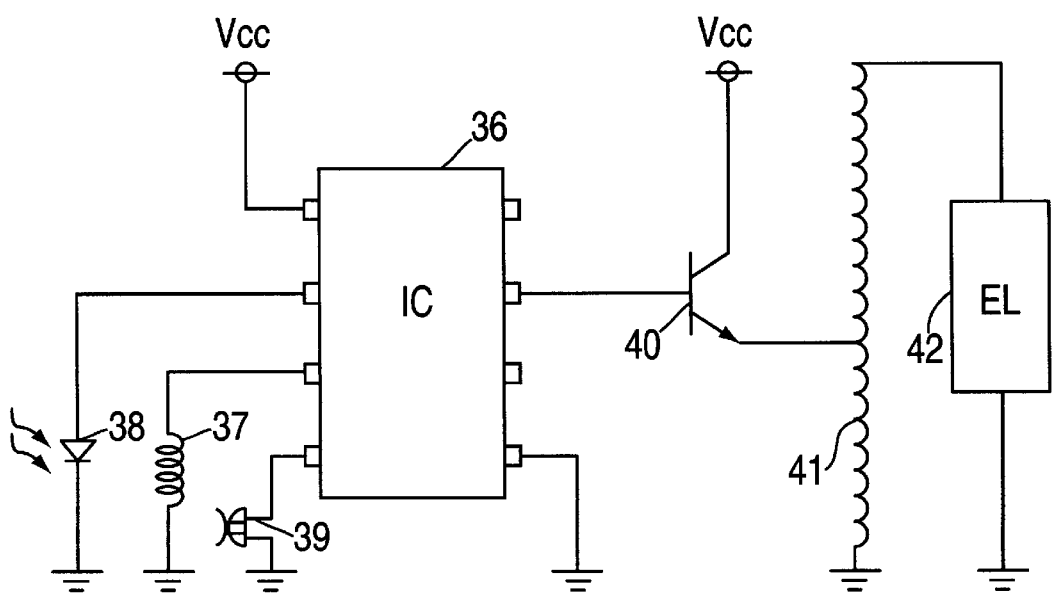
FIG. 1H is a schematic circuit diagram of an alternative circuit which could be used in connection with the three-dimensional electro-luminescent lighting elements of the preferred embodiments of the invention, and which includes and inductor.
Figure 2A:
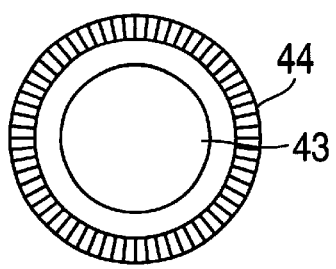
FIGS. 2A–2G are cross-sectional views of various arrangements for attaching the three-dimensional electro-luminescent lighting arrangement of the invention to various objects.
Figure 2B:
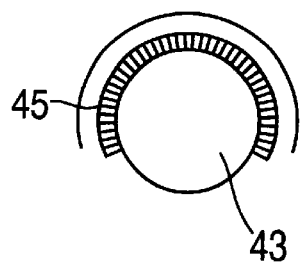
Figure 2C:
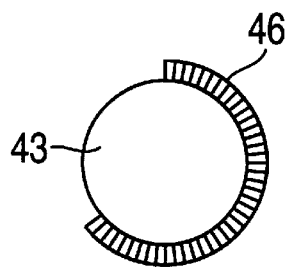
Figure 2D:
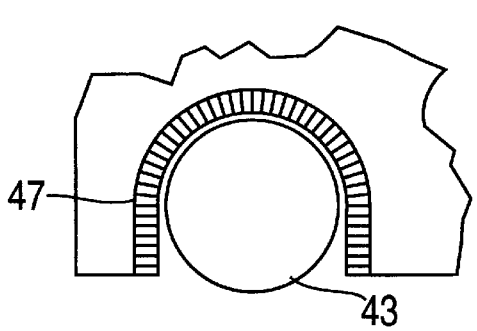
Figure 2E:
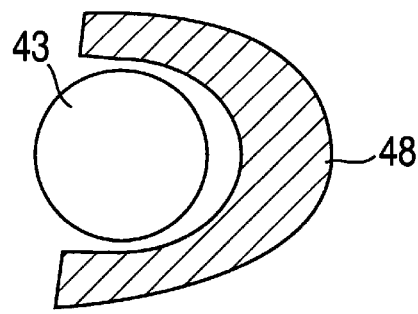
Figure 2F:
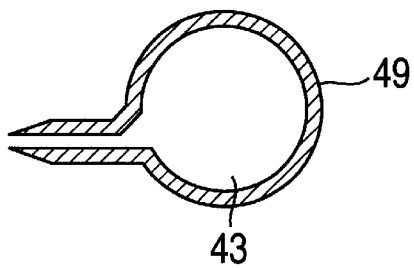
Figure 2G:
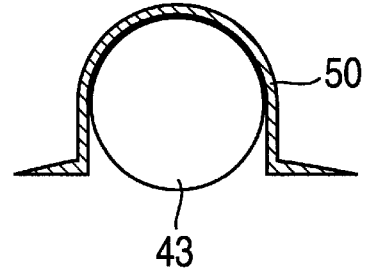

Alternatively, as illustrated in FIG. 1H, the control circuit could be in the form of an integrated circuit 36 capable of actuating the switch in a variety of patterns responsive to setting of a selector switch 37, such as the selector switch of the audio device, a light sensitive switch 38, and/or a microphone 39, the integrated circuit supplying pulses to cause drive transistor 40 to turn on and off at an appropriate frequency and timing, with the voltage being adjusted by an inductor or transformer 41 connected between the drive transistor 40 and electro-luminescent lighting element 42.

Of course, it will be appreciated that the specific basic circuit elements illustrated in FIGS. 1G and 1H can be replaced by other circuits which perform the functions represented in FIG. 1E, for example by including in the inverter circuit a function interface having means for outputting pulses which enable the electro-luminescent lighting element to be turned on for various periods of time to provide special effects selected from the group consisting of flashing, steady-on, chasing, random, and fade-in/fade-out effects, either in response to or in addition to triggering provided by the audio circuitry.

Similarly, it will be appreciated by those skilled in the art that in addition to a manual switch or a function switch of the audio device, the switch used in the various embodiments of the invention can include one or more additional mechanical or electric switches sensitive to conditions such as ambient light, vibrations, humidity, heat, sound, tilt, movement of a rolling ball, and so forth.

As described in copending application Ser. No. 08/758,393, filed Nov. 29, 1996 now U.S. Pat. 6,082,867, the three-dimensional electro-luminescent lighting elements 43 of the present invention can be mounted in a variety of different housing configurations or housing elements 44–50, including circular and semi-circular structures, and in grooves, frames, or envelopes, and so forth, as illustrated respectively in FIGS. 2A–2G. In addition, the fastening means by which the lighting elements are attached to the main object can include clips, hose holders, adhesives, and Velcrot™ hook and loop fasteners, preferably extending around less than 180° of the lighting elements.

Figure 3:
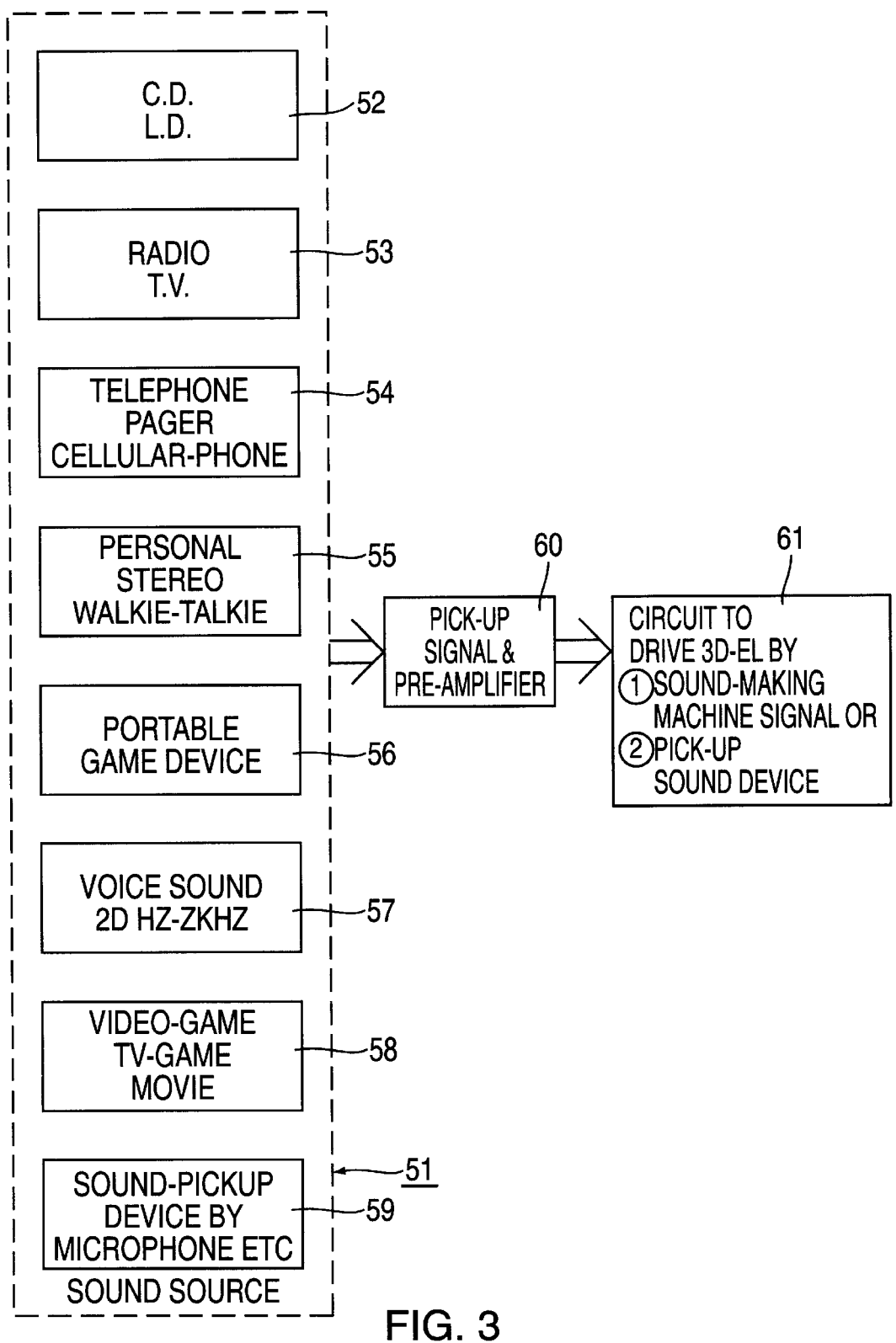
FIG. 3 is a functional block diagram illustrating a preferred connection arrangement for the three-dimensional electro-luminescent elements of the preferred embodiment of the invention.

In general, the above principles can be applied to mount and electrically connect the electro-luminescent lighting elements described above to a variety of audio devices, the devices generally including as shown in FIG. 3 a sound source or pick-up device 51, which can be in the form of a compact disc or laser disc player 52, a conventional radio or television 53, a telephone, pager, or cellular communication device 54, a portable tape player, radio or walkie talkie 55, a portable game player 56 such as Nintendo's GameBoy™, a voice synthesizer or personal computer with a sound card 57 or other musical synthesizer or keyboard device, a video console 58 or other display device such as an alarm system, or a microphone or other sound pick-up device 59. The outputs of these devices may be connected directly to a pre-amplifier/receiver circuit 60 and used to trigger the electro-luminescent element 61 when an appropriate trigger frequency is output by the device.

Figure 3A:
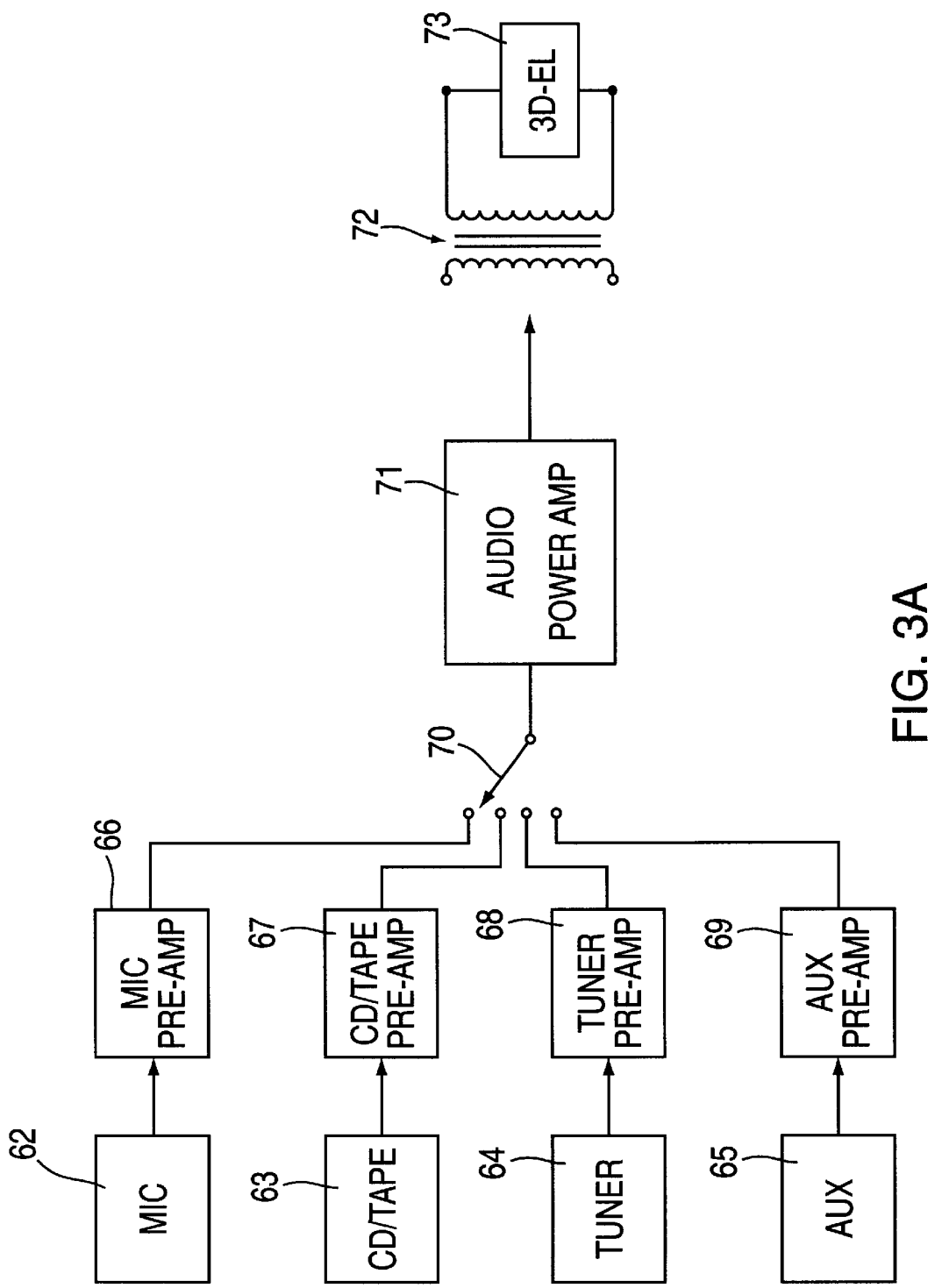
FIG. 3A is a functional block diagram illustrating a specific implementation of the system shown in FIG. 3.

FIG. 3A shows an example of an audio system with multiple sound sources, including a microphone 62, compact disc/tape player 63, tuner 64, and an external or auxiliary input 65, pre-amplifiers 66–69 for each of the sources, a selector switch 70, and an audio power amplifier 71 whose output is connected not only to speakers (not shown), but also to a transformer or inductor 72 which serves to supply an appropriate trigger voltage and frequency to the three-dimensional electro-luminescent element or elements 73.

Figure 3B:
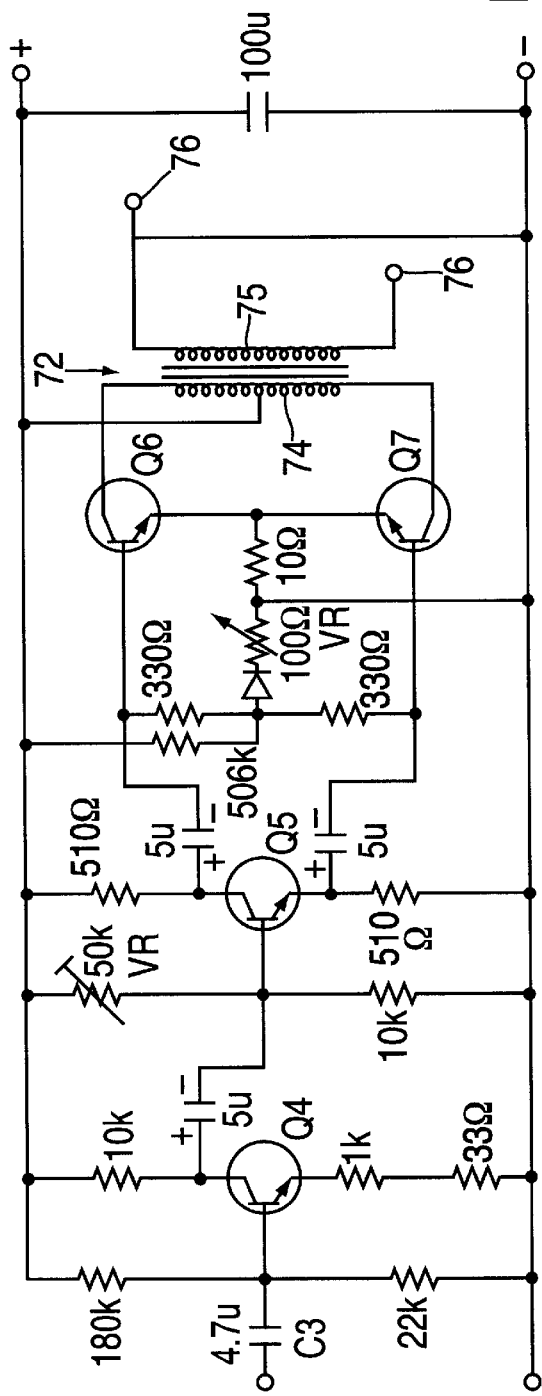
FIG. 3B is a schematic circuit diagram showing a conventional power amplifier circuit which can be used to trigger an electro-luminescent lighting element according to the principles of the invention.

FIG. 3B shows a conventional power amplifier circuit suitable for use as the power amplifier 71 shown in FIG. 3A, including output transistors Q6 and Q7 connected the primary winding 74 of transformer 72, with the secondary winding 75 of transformer 72 having outputs 76 which may be connected to the electro-luminescent element 73 shown in FIG. 3A. Details of this circuit are well-known to those in the electronics arts and consequently are not described further here.

Figure 3C:
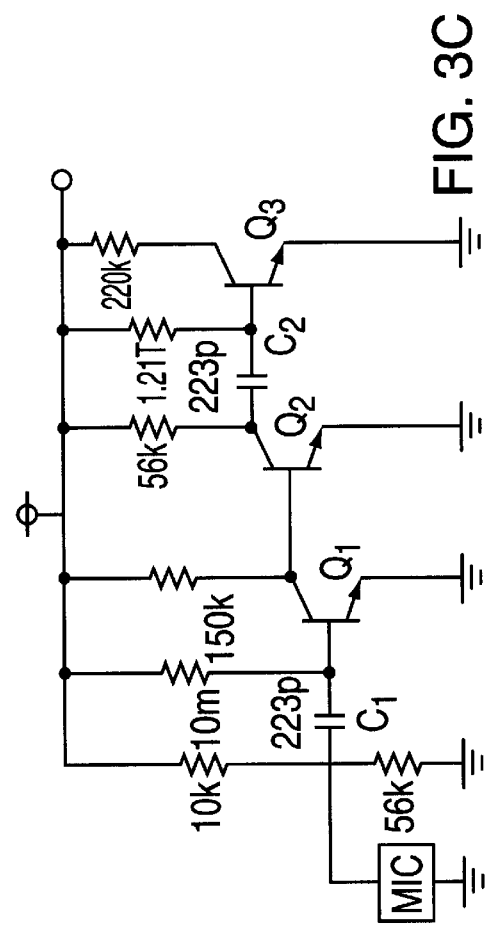
FIG. 3C is a schematic circuit diagram showing an otherwise conventional microphone pre-amplifier circuit that can be used to trigger an electro-luminescent lighting element according to the principles of the invention.

FIG. 3C shows a conventional microphone pre-amplifier circuit adapted to output a signal which can be supplied to a transformer or inductor for triggering an electro-luminescent lamp. Each of the components and the arrangement of components is otherwise conventional, but with the illustrated component values being suitable for connection to the trigger circuit or transformer/inductor 72 for the electro-luminescent lamp 73 of FIG. 3A.

Figure 4:
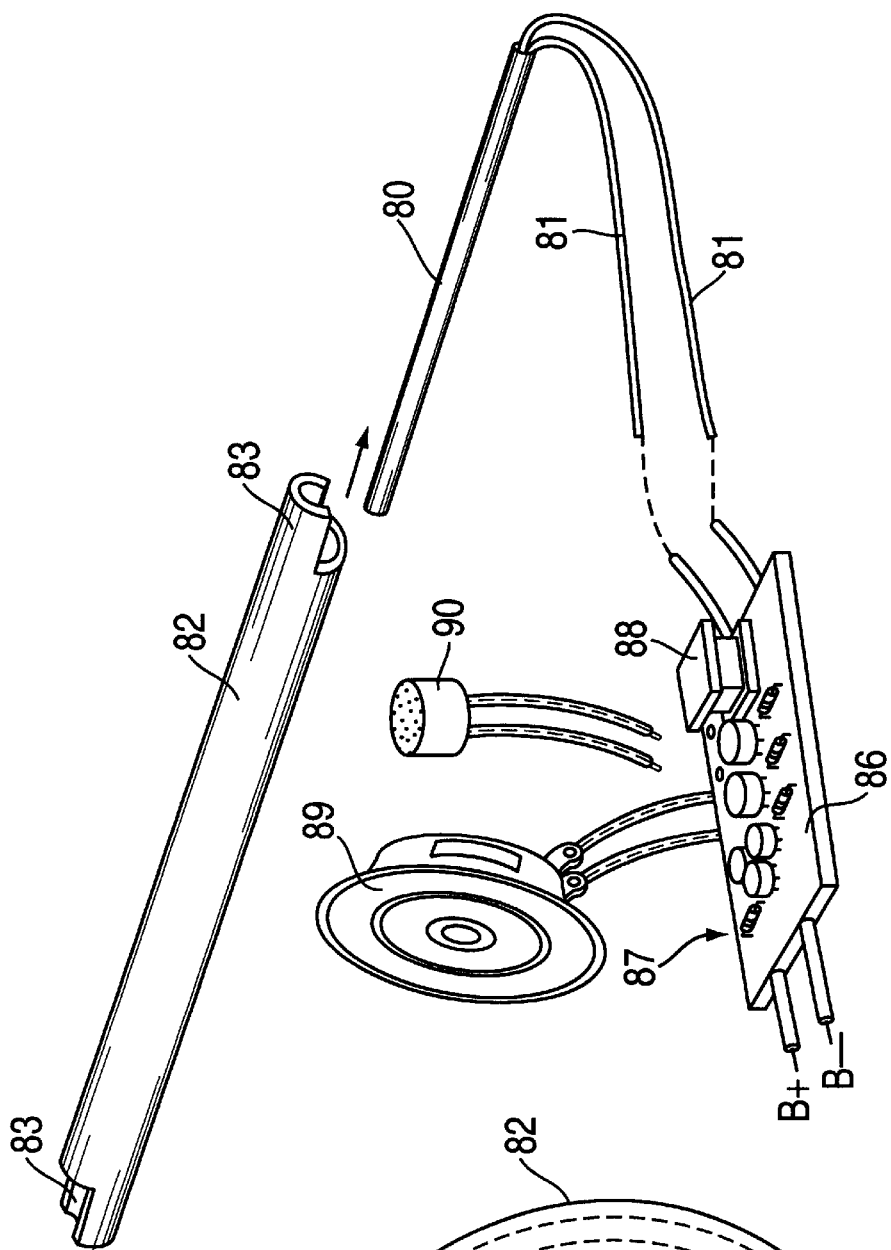
FIG. 4 is a perspective views showing a specific connection arrangement which can be used with the circuit illustrated in FIG. 3C.
Figure 4A:
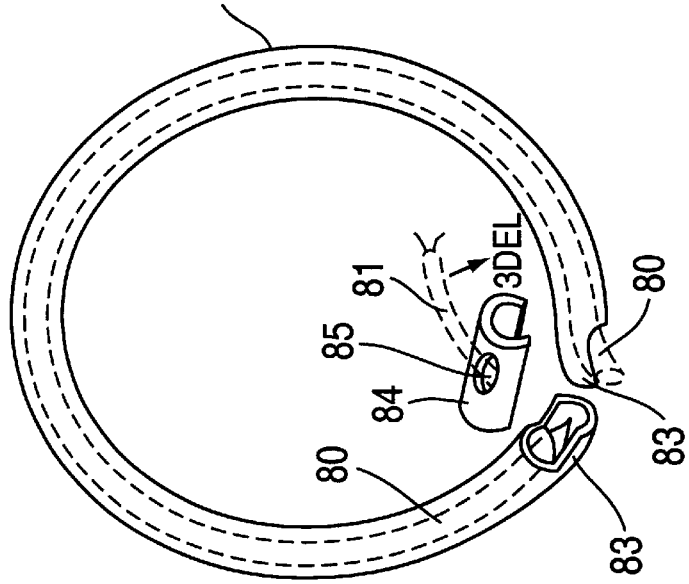
FIG. 4A is a perspective view showing the manner in which the piping illustrated in FIG. 4 is connected to form a closed figure.
Figure 5A:
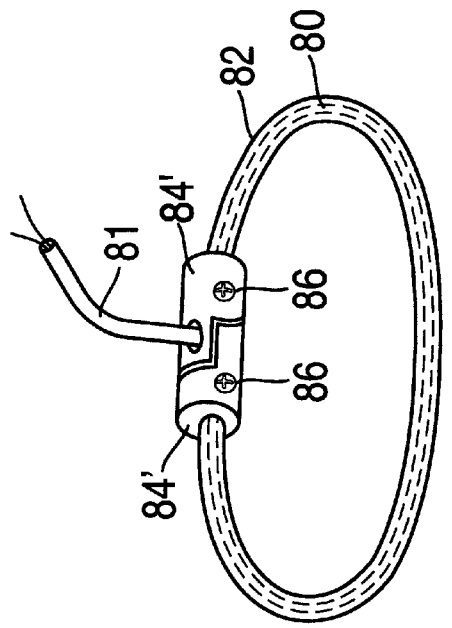
FIG. 5A is a perspective view of the connection and mounting arrangement of FIG. 5, after coupling.
Figure 5:
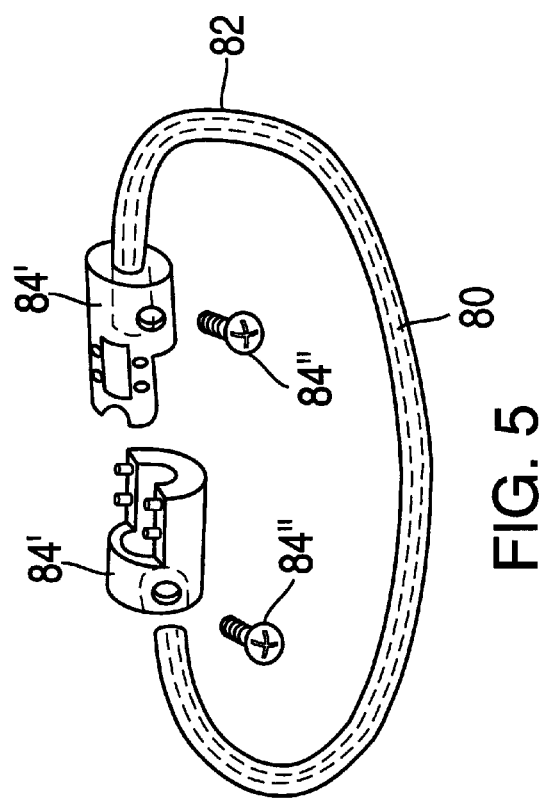
FIG. 5 is a perspective view of an alternative connection and mounting arrangement before coupling.

FIG. 4 shows in detail a mounting and electrical connection arrangement for a three-dimensional electro-luminescent element which is suitable for use with a variety of audio devices. In this implementation, an electro-luminescent element 80 having leads 81 is placed within a sleeve or piping 82 made of a transparent material such as polyvinyl chloride (PVC), with the ends 83 of the piping being arranged to fit together and to be held in place by a clip or holder 84 having an opening 85 for the leads 81, as shown in FIG. 4A, leads 81 being connected to a circuit board 86 on which are mounted circuit components 87, such as transformer 88, and to which are also connected a speaker 89 and/or a microphone 90. Alternatively, as shown in FIG. 5, the single holder 84 for the ends of the piping can be replaced by connectors 84' attached to each end of the piping and held together by, for example, screws 84 for a more secure coupling and electrical connection.

Figure 6:
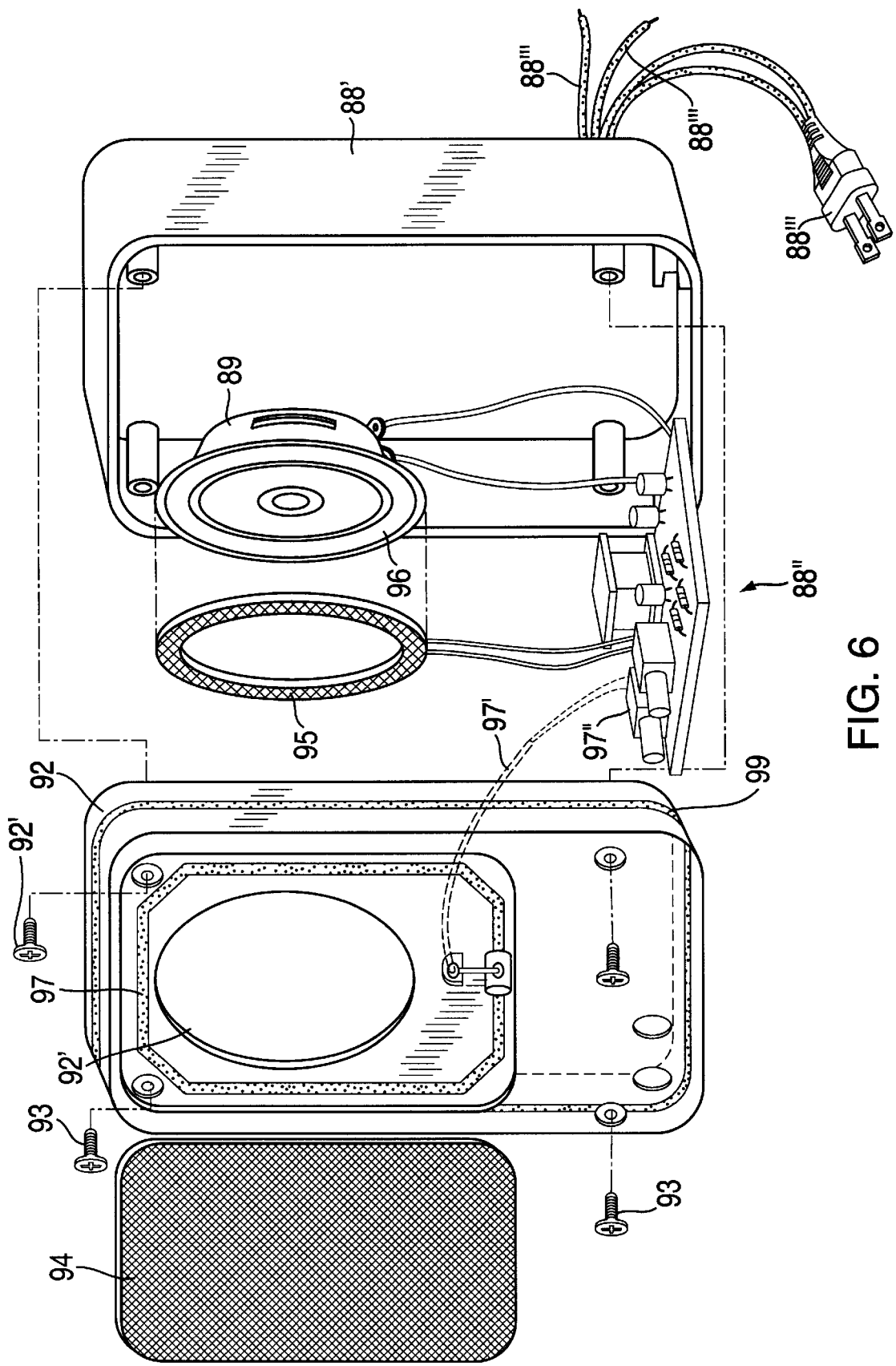
FIG. 6 is an exploded perspective view of a speaker including a lighting arrangement constructed according to the principles of the invention, and which can be used with the power amplifier circuit illustrated in FIG. 3B and the lighting element connection and mounting arrangement illustrated in FIGS. 4, 4A, 5, and 5A.
Figure 7:
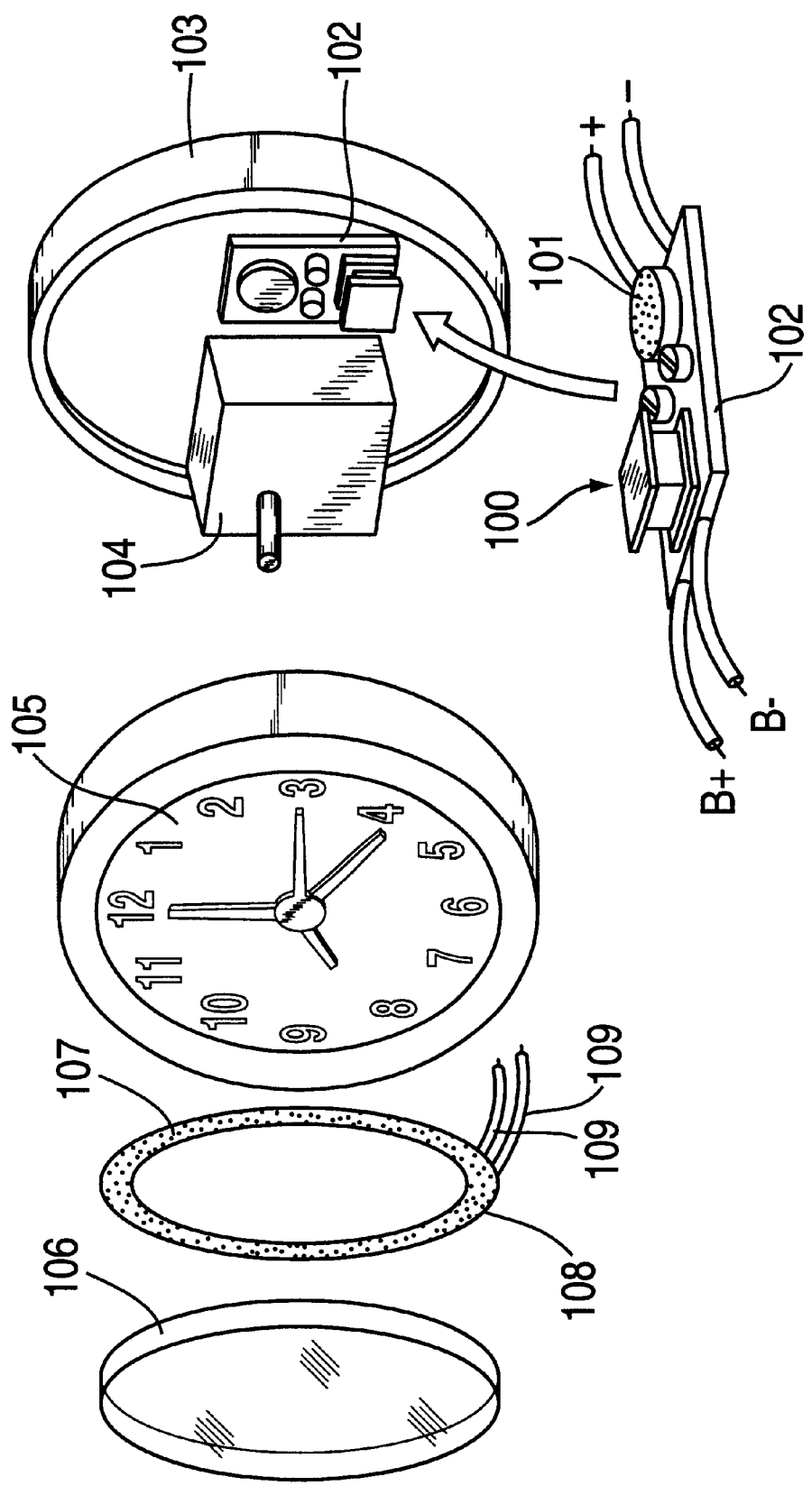
FIG. 7 is an exploded perspective view of an alternative audio device having a display panel and an illumination arrangement constructed according to the principles of the invention.

FIG. 6 shows a speaker system of the type having its own amplifier, constructed in accordance with the principles of the invention, including a conventional main housing or cabinet 88', speaker driving circuitry 88', a power supply connection 88''' and audio signal connections 88'''', speaker element 89, cover 92 secured to the main housing by screws 93, and a grill or screen 94. In this embodiment of the invention, one three dimensional electro-luminescent element 95 of the type described above is placed on the casing 96 for the speaker element, another three dimensional electro-luminescent element 97 surrounds the sound opening 92' in cover 92, and a third three-dimensional electro-luminescent element 99 is positioned around the periphery of the cover, the second and third electro-luminescent elements 98 and 99 being either positioned on the surface of the cover, in grooves in the surface, or behind transparent portions of the cover utilizing, for example, any of the structure shown in FIGS. 2A–2G. By connecting the electro-luminescent elements such as electro-luminescent elements 97, by way of wires 97' a trigger circuit 97" responsive to the speaker driving signals, the electro-luminescent elements can be caused to flash in time to music or sounds being played by the speaker. The speaker can of course be a stand-alone speaker, or part of any of the devices illustrated in FIG. 3.

In an alternative embodiment of the invention which also incorporates the arrangement illustrated in FIGS. 4, 4A, 5, and 5A, an audio/trigger circuit 100 such as the circuit illustrated in FIG. 3C, including a microphone 101, is mounted on a circuit board 102 positioned in the housing 103 of, for example, a clock having a clock mechanism 104, display panel 105, and lens 106 behind which the electro-luminescent element 107 is mounted in a sleeve or piping 108 connected by wires 109 to the circuit board 101 to provide a voice activated illuminated clock. Those skilled in the art will appreciate that, instead of a clock face, the display could be a sign or other message, informational, or artistic display, or for example the display of an alarm system.

Figure 8:
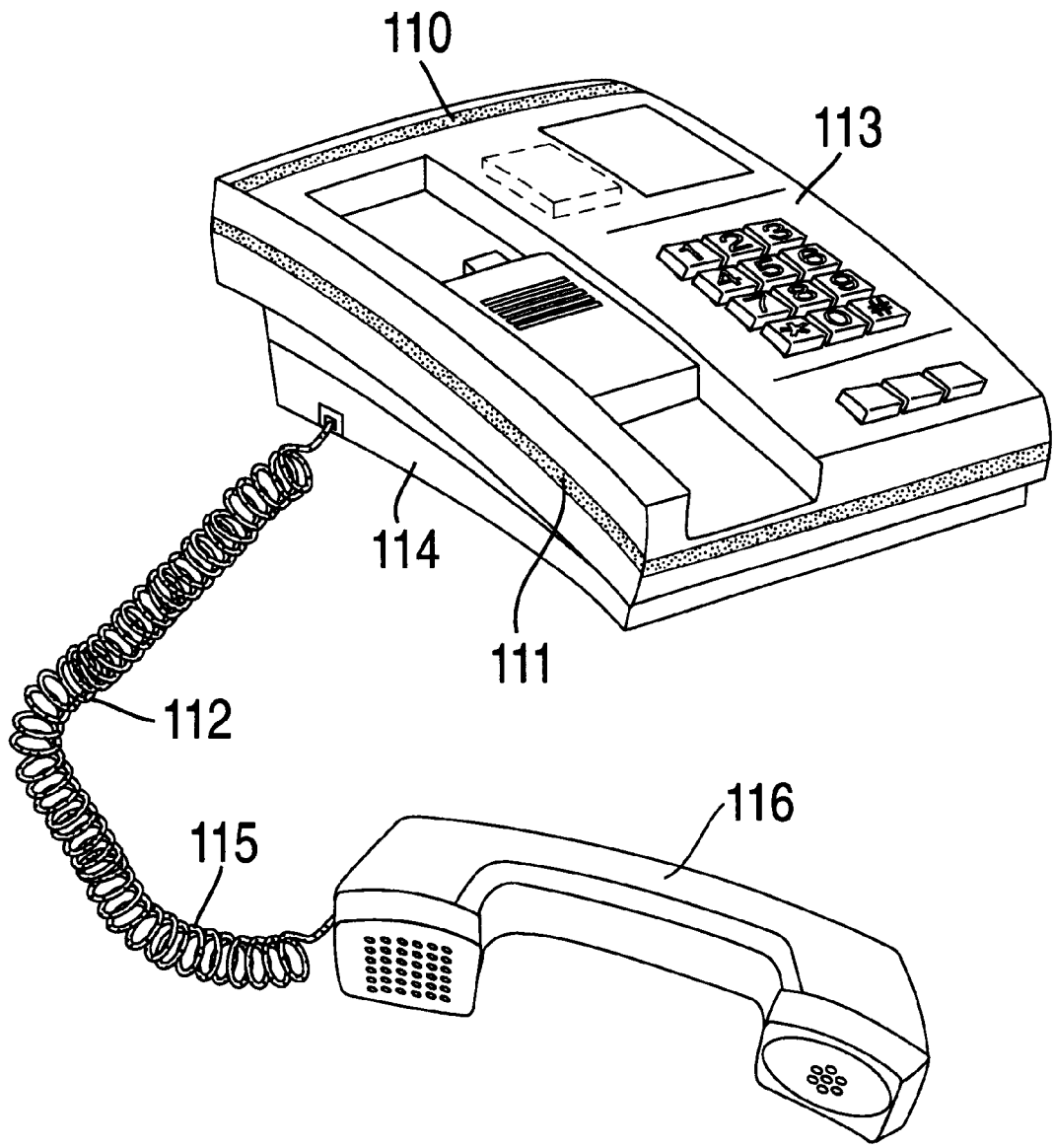
FIG. 8 is a perspective view of a telephone including an illumination arrangement constructed according to the principles of the invention.

In the embodiment illustrated in FIG. 8, the audio device to which the principles of the invention are applied is a telephone. In this embodiment, three-dimensional electro-luminescent elements 110–112 are respectively situated on the main panel 113 of the telephone, on the side 114 of the telephone, and enclosed within a transparent cord 115 of the headset 116. As those skilled in the art will appreciate, the electro-luminescent elements could be connected to the telephone line power supply which also powers the ringer or speaker (not shown) so that the electro-luminescent elements are lit whenever the telephone rings or is activated.

Figure 9:
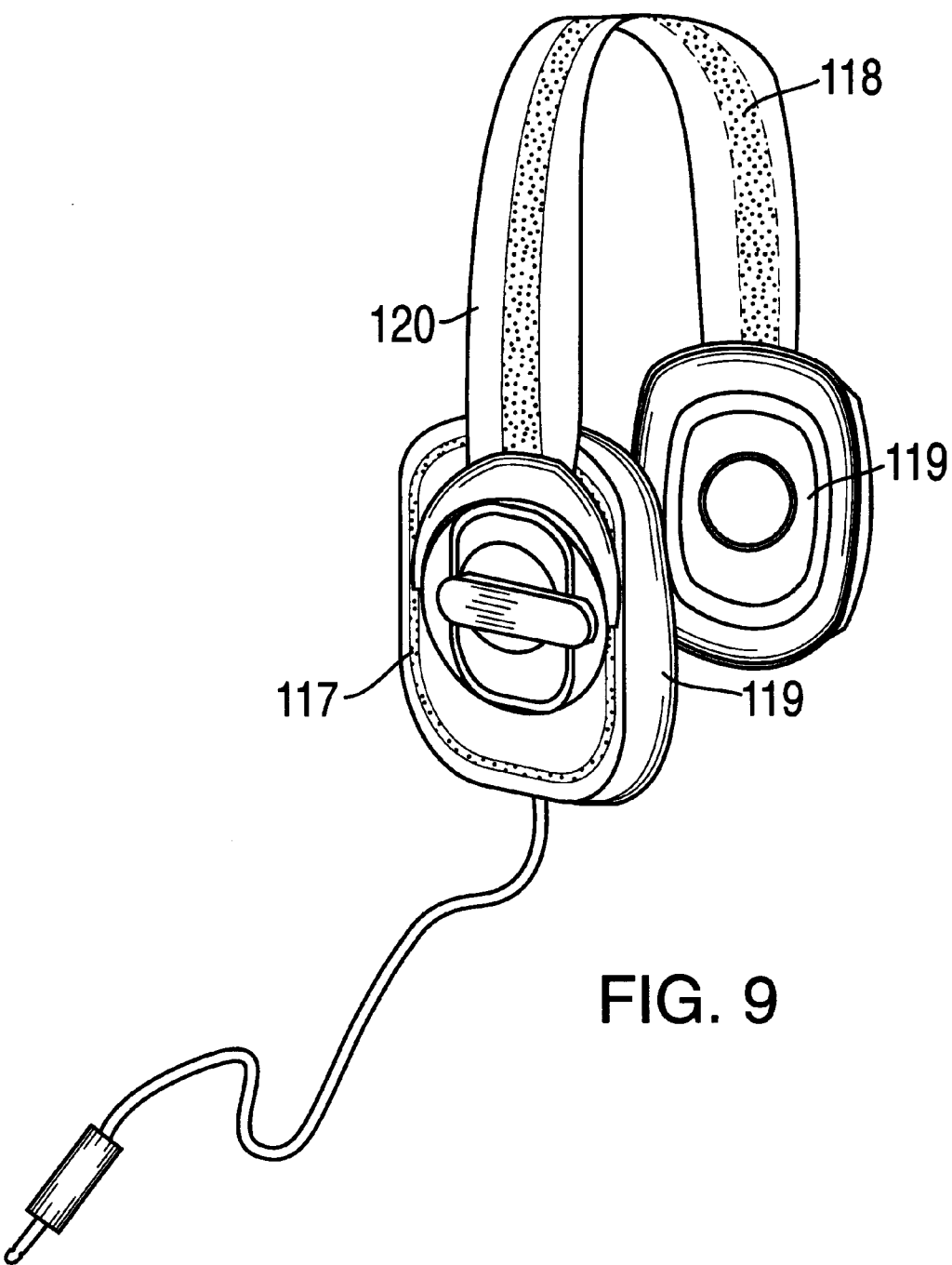
FIG. 9 is a perspective view of a headset including an illumination arrangement constructed according to the principles of the invention.
Figure 11:
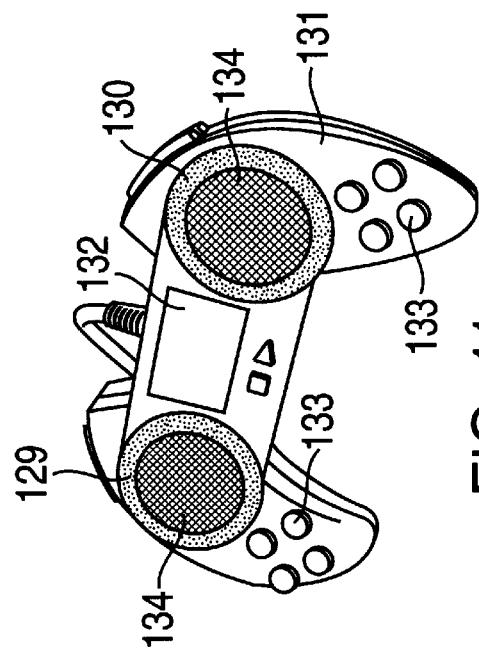
FIG. 11 is a perspective view of a video game console including an illumination arrangement constructed according to the principles of the invention.
Figure 10:
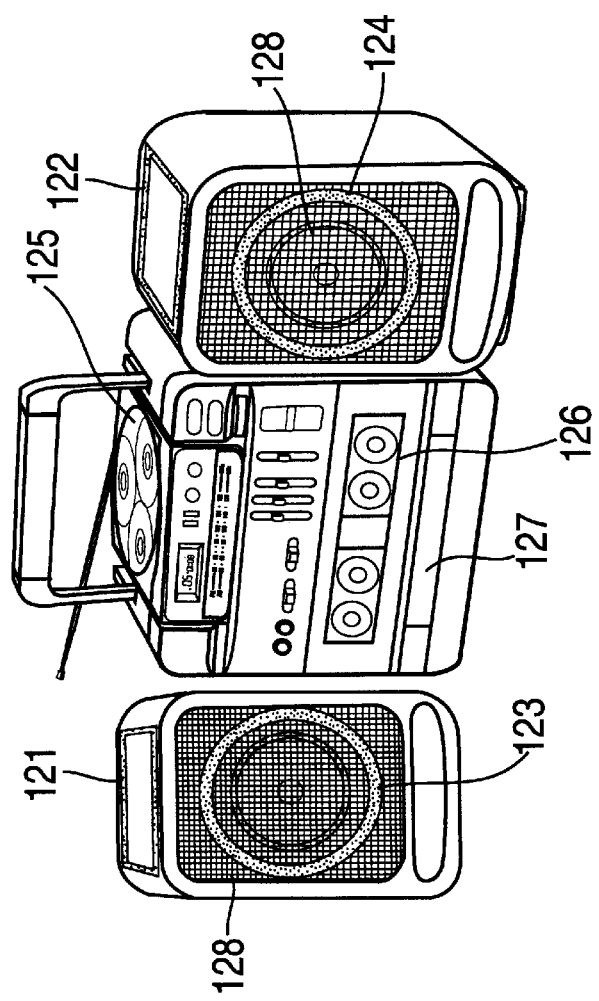
FIG. 10 is a perspective view of a portable stereo system including an illumination arrangement constructed according to the principles of the invention.

According to still further embodiments of the invention, three-dimensional electro-luminescent elements 117 and 118 could be applied to a headset having earpieces 119 and a connecting member 120 on or within which three-dimensional electro-luminescent elements 117 and 118 are situated, as shown in FIG. 9, three-dimensional electro-luminescent elements 121–124 could be applied to a portable stereo system or "boombox" having a compact disc player 125, radio or cassette 126, and/or a laser disc player 127, and speakers 128 around which the electro-luminescent elements 121–124 are placed, as shown in FIG. 10, or electro-luminescent elements 129 and 130 could be applied to a game console 131 having a video screen 132, actuating buttons 133, and speakers 134 around which the three-dimensional elements 129 and 130 are placed to flash in response to sound effects of a game being played.

It will of course be appreciated by those skilled in the art that the illumination arrangements used in any of the illustrated audio devices can be in the form either of a single element, or multiple elements connected by wires as shown in FIG. 1C, and that the illustrated devices can use any combination or just one of the above piping arrangements, or variations thereof which may occur to those skilled in the art. The advantage of using multiple elements connected by wires is of course that the more expensive electro-luminescent material can be limited to exposed areas, with the relatively inexpensive wires traversing the hidden areas.

Having thus described various preferred embodiments of the invention, those skilled in the art will appreciate that variations and modifications of the preferred embodiment may be made without departing from the scope of the invention. It is accordingly intended that the invention not be limited by the above description or accompanying drawings, but that it be defined solely in accordance with the appended claims.

I claim:

1. An audio device comprising:
   an audio circuit having an output for audio signals representative of a sound source;
   an illumination arrangement including a three-dimensional electro-luminescent lighting element, said three-dimensional electro-luminescent lighting element being arranged to emit light in multiple directions, and wherein a center conductor and a coaxial outer conductor of the three-dimensional lighting element, which are electrically connected to an output of the audio circuit; and
   said three-dimensional electro-luminescent lighting element providing illumination in response to audio output signals of said audio circuit over an arc angle of from 10° to 360°.

2. The audio device according to claim 1, further comprising a plurality of additional three-dimensional electro-luminescent lighting elements connected to the output of the audio circuit by wires.

3. The audio device according to claim 2, wherein said audio circuit includes means for causing said three-dimensional electro-luminescent lighting elements to turn on or off for periods of time according to a predetermined pattern.

4. The audio device according to claim 3, wherein said predetermined pattern includes special effects selected from the group consisting of flashing, steady on, chasing, random, fade in/fade out, color changing, light intensity changing, and partial length lighting effects.

5. The audio device according to claim 2, wherein the lighting elements have different colors.

6. The audio device according to claim 1, further comprising a plurality of additional three-dimensional elements connected to each other by wires connected to the center and outer conductors of the elements.

7. The audio device according to claim 6, wherein the three-dimensional lighting elements are connected in series.

8. The audio device according to claim 7, wherein the three-dimensional lighting elements are connected in parallel.

9. The audio device according to claim 1, wherein said audio device is selected from the group consisting of a compact disc, a laser disc player, a conventional radio, a television, a telephone, a pager, a cellular communication device, a portable tape player, a walkie-talkie, a portable video game player, a voice synthesizer, a personal computer with a sound card, a video console, a display device, an alarm system, a microphone, and a sound pick up device.

10. The audio device according to claim 1, wherein the audio device is a laser disc player.

11. The audio device according to claim 1, wherein the three-dimensional electro-luminescent lighting element is situated in an interior of an at least partially transparent housing of a main object.

12. The audio device according to claim 1, wherein the three-dimensional electro-luminescent lighting element is situated on an exterior surface of a main object.

13. The audio device according to claim 1, wherein said three-dimensional electro-luminescent lighting element is situated between an edge of a main object and a portion of a display on the main object.

14. The audio device according to claim 1, wherein the three-dimensional lighting element is attached to a main object by threading it through openings in the main object.

15. The audio device according to claim 14, wherein the openings are selected from the group consisting of cutouts, tunnels, and rivet holes.

16. The audio device according to claim 1, wherein an attachment means is selected from the group consisting of clips, hose holders, adhesives, and Velcro™ hook and loop fasteners extending around less than 180° of the three-dimensional electro-luminescent lighting element.

17. The audio device according to claim 1, wherein the electrical circuit means includes a power supply selected from the group consisting of non-rechargeable batteries, rechargeable batteries, generators, capacitors and a public power supply.

18. The audio device according to claim 1, wherein the electrical circuit includes switch means for changing a characteristic of the three-dimensional electro-luminescent lighting element selected from the group consisting of intensity, brightness, color and illuminated area in response to an external condition.

19. The audio device according to claim 1, wherein the three-dimensional electro-luminescent lighting element is arranged to emit white light, and wherein colors are obtained by a tube surrounding the lighting element.

20. The audio device according to claim 19, wherein the tube includes light altering means selected from the group consisting of color filters, stencils and masks.

21. The audio device according to claim 1, wherein the three-dimensional electro-luminescent lighting element is arranged to emit white light, and wherein colors are obtained by a housing of a main object which at least partially surrounds the three-dimensional lighting element.

22. The audio device according to claim 1, wherein different colors are obtained by wiring small sections of the three-dimensional electro-luminescent lighting element and controlling a frequency and voltage applied to the different sections.

23. The audio device according to claim 1, wherein different colors are obtained by coating different phosphor materials along a length of the three-dimensional electro-luminescent lighting element.

24. The audio device according to claim 1, wherein the three-dimensional electro-luminescent lighting element includes a plurality of elements connected by wires and said three-dimensional lighting element is threaded through openings in a sleeve such that lighting elements are exposed and said wires are hidden.

25. A sound pick-up device with three-dimensional electro-luminescent lighting elements, comprising:
   circuit means for converting sounds received by said device from a sound source into trigger signals capable of triggering said three-dimensional electro-luminescent lighting elements;
   said three-dimensional electro-luminescent lighting elements being arranged to emit light in multiple directions, and wherein a center conductor and a coaxial outer conductor of the three-dimensional electro-luminescent lighting element comprise wires stripped to form terminals of the three-dimensional electro-luminescent lighting element, which are electrically connected to an output of an audio circuit; and attachment means for attaching the three-dimensional electro-luminescent lighting elements to a main object to provide illumination responsive to said trigger signals over an arc angle off from 10° to 360°.

26. The sound pick-up device according to claim 25, wherein said sound source is external to the audio device such that said sounds are not generated by the audio device.

27. The sound pick-up device according to claim 25, wherein said sound pick-up device includes device includes an adjustable sensitivity microphone for picking up sounds having a frequency of from approximately 10 Hz to approximately 30,000 Hz to thereby trigger the three-dimensional electro-luminescent element.

28. The sound pick-up device according to claim 25, further comprises means for triggering the three-dimensional electro-luminescent element based on an output of the sound-pickup device, and for continuously varying an intensity and color of light emitted by the three-dimensional electro-luminescent element based on variations in amplitude and frequency of said output.

* * * * *